(12) United States Patent
Dee et al.

(10) Patent No.: US 6,544,318 B2
(45) Date of Patent: Apr. 8, 2003

(54) HIGH PURITY OXYGEN PRODUCTION BY PRESSURE SWING ADSORPTION

(75) Inventors: Douglas Paul Dee, Fogelsville, PA (US); Robert Ling Chiang, Basking Ridge, NJ (US); Edwin John Miller, Allentown, PA (US); Roger Dean Whitley, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/782,236

(22) Filed: Feb. 13, 2001

(65) Prior Publication Data

US 2002/0144596 A1 Oct. 10, 2002

(51) Int. Cl.$^7$ .......................................... B01D 53/047
(52) U.S. Cl. ............................ 95/96; 95/127; 95/130; 95/902; 96/130; 96/132; 96/143
(58) Field of Search ........................... 95/96–105, 116, 95/127, 130, 902; 96/130–133, 143, 144

(56) References Cited

U.S. PATENT DOCUMENTS

| | | | |
|---|---|---|---|
| 3,487,608 A | * 1/1970 | Graff | 96/130 X |
| 4,880,443 A | 11/1989 | Miller et al. | 55/26 |
| 4,892,567 A | * 1/1990 | Yan | 95/902 X |
| 5,226,933 A | 7/1993 | Knaebel et al. | 55/26 |
| 5,470,378 A | 11/1995 | Kandybin et al. | 95/100 |
| 5,529,610 A | * 6/1996 | Watson et al. | 96/133 X |
| 5,601,634 A | * 2/1997 | Jain et al. | 95/130 X |
| 5,624,477 A | * 4/1997 | Armond | 96/132 X |
| 5,656,066 A | * 8/1997 | Reiss et al. | 95/130 X |
| 5,674,311 A | * 10/1997 | Notaro et al. | 96/133 X |
| 5,769,928 A | * 6/1998 | Leavitt | 96/130 X |
| 5,885,331 A | * 3/1999 | Reiss et al. | 95/130 X |
| 5,922,107 A | * 7/1999 | Labasque et al. | 95/130 X |
| 6,027,548 A | * 2/2000 | Ackley et al. | 96/132 X |
| 6,106,593 A | * 8/2000 | Golden et al. | 96/143 X |
| 6,152,991 A | * 11/2000 | Ackley | 96/132 X |

FOREIGN PATENT DOCUMENTS

| | | | |
|---|---|---|---|
| EP | 0761282 A2 | 3/1997 | |
| JP | 62-148304 A | * 7/1987 | ............ 96/132 |
| JP | H10152305 | 6/1998 | |
| WO | WO00/40332 | 7/2000 | |

OTHER PUBLICATIONS

B. E. Wilkerson, B.S., "The Adsorption of Argon and Oxygen on Silver Mordenite", The Ohio State University, 1990, Thesis.

N. D. Hutson, et al., "Mixed Cation Zeolites: $Li_x Ag_y$–X as a Superior Adsorbent for Air Separation", *AIChE Journal*, Apr. 1999, vol. 45, No. 4, pp. 724–734.

N. D. Hutson, et al., "Structural Effects on Adsorption of Atmospheric Gases in Mixed Li,Ag–X–Zeolite", *AIChe Journal*, Nov. 2000, vol. 46, No. 11, pp. 2305–2317.

R. T. Yang, et al., "Zeolites Containing Mixed Cations for Air Separation by Weak Chemisorption–Assisted Adsorption", *Ind. Eng. Chem. Res.*, 1996, 35, pp. 3093–3099.

* cited by examiner

*Primary Examiner*—Robert H. Spitzer
(74) *Attorney, Agent, or Firm*—John M. Fernbacher

(57) ABSTRACT

Pressure swing adsorption process for the recovery of high purity oxygen from a feed gas comprising oxygen, nitrogen, and argon. The process includes a forward flow stage which comprises (a) passing the feed gas into a first adsorption zone containing an adsorbent selective for the adsorption of nitrogen over oxygen and argon, and withdrawing therefrom a nitrogen-depleted intermediate gas; (b) passing the nitrogen-depleted intermediate gas into a second adsorption zone containing an adsorbent which is selective for the adsorption of nitrogen over argon and selective for the adsorption of argon over oxygen; (c) withdrawing an oxygen-enriched product gas from the second adsorption zone; and (d) terminating the passing of feed gas into the first adsorption zone and withdrawing an oxygen-enriched depressurization gas from the second adsorption zone in the same flow direction as (c). During (a) or during (d), nitrogen breakthrough from the first adsorption zone can occur and nitrogen can be adsorbed in the second adsorption zone.

15 Claims, 4 Drawing Sheets

HIGH PURITY OXYGEN PRODUCTION BY PRESSURE SWING ADSORPTION

BACKGROUND OF THE INVENTION

Pressure swing adsorption is a well-known method for the separation of air to recover nitrogen-rich or oxygen-rich gas products. One particular application is the recovery of oxygen from air utilizing zeolite adsorbents to yield product gas containing up to 95 vol % oxygen. At this product purity, the remaining component in the product gas is essentially argon because argon and oxygen exhibit similar adsorption characteristics relative to nitrogen on typical commercially-available zeolite adsorbents. The adsorption selectivity of argon relative to oxygen is typically near or below unity for these adsorbents.

Recent work in the field of adsorptive air separation has shown that certain silver-exchanged zeolites, particularly silver-exchanged X-type zeolites, exhibit adsorption selectivity for argon relative to oxygen, which makes it feasible to produce oxygen at purities above 95 vol %.

The use of silver-exchanged zeolites in pressure swing adsorption processes for oxygen recovery has been reported by a number of workers in the field. U.S. Pat. No. 5,226,933 discloses a pressure swing adsorption process which uses a bed of silver mordenite for splitting oxygen from a gas comprising 95% oxygen and 5% argon to achieve an oxygen purity of at least about 99.7%. U.S. Pat. No. 5,470,378 describes a process for removing argon from a feed gas stream comprising oxygen and argon to yield a high purity oxygen stream. The process uses a bed comprising a Ag ion-exchanged type X zeolite wherein at least 80% of the available ion sites are occupied by silver.

Japanese Patent Application Kokai No. H10-152305 (Application No. H8-311051) discloses a pressure swing adsorption device for oxygen production which uses an adsorption column with a nitrogen adsorbent layer that adsorbs nitrogen selectively from a feed gas which contains nitrogen, oxygen, and argon. The nitrogen adsorbent layer contains at least a Ag ion-exchanged X-type zeolite. The adsorption column may contain more than one layer, and the layer on the gas exit side of the column contains a Ag ion exchanged X-type zeolite. It is claimed that argon is adsorbed more readily than oxygen and that a product gas containing 95% oxygen or higher can be obtained.

An apparatus for producing high purity oxygen from air is disclosed in European Patent publication EP 0 761 282 A2 wherein the apparatus comprises a pressure vessel in which is located a first bed of adsorbent which preferentially adsorbs nitrogen and spaced therefrom a second bed of adsorbent which preferentially adsorbs argon.

N. D. Hutson et al in an article entitled "Mixed Cation Zeolites: $Li_xAg_y$-X as a Superior Adsorbent for Air Separation" published in the *AIChE Journal*, April 1999, Vol. 45, No. 2, pp. 724–734 disclose the use of a silver-exchanged Li—Na-X zeolite for air separation. A simulation of a standard five-step PSA process was carried out using a single bed of $Li_{94.2}Na_{0.7}Ag_{1.1}$-X zeolite having a Si/Al ratio of 1.0. The simulation used a feed gas of 22% oxygen and 78% nitrogen. An oxygen product purity of 96.42% was reported at an oxygen recovery of 62.74%. R. T Yang et al disclose similar simulation results in PCT International Publication No. WO 00/40332.

N. D. Hutson et al describe the properties of Li—Ag-X zeolites for air separation in an article entitled "Structural Effects on Adsorption of Atmospheric Gases in Mixed Li,Ag-X-Zeolite" published in the *AIChE Journal*, November 2000, Vol. 46, No. 11, pp. 2305–2317.

U.S. Pat. No. 4,880,443 discloses a series two-bed adsorption system for recovering oxygen from air in which nitrogen is selectively adsorbed in a first bed which contains a zeolite and argon is selectively adsorbed in a second bed which contains a carbon molecular sieve.

The production of high purity oxygen containing greater than 95 vol % oxygen from air by pressure swing adsorption with corresponding high oxygen recovery is an important objective in the industrial gas industry. The production of high purity oxygen at 97 vol % and above is particularly desirable for certain markets. The invention described below and defined by the claims which follow addresses this need with a multiple-zone pressure swing adsorption process which recovers oxygen at greater than 97% purity from air while achieving high adsorbent utilization by selective operation of the multiple-zone system.

BRIEF SUMMARY OF THE INVENTION

The invention is a combined forward flow stage which is a part of a cyclic pressure swing adsorption process for the recovery of oxygen from a feed gas comprising oxygen, nitrogen, and argon. The combined forward flow stage comprises (a) passing the feed gas into a first adsorption zone containing an adsorbent selective for the adsorption of nitrogen over oxygen and argon, and withdrawing therefrom a nitrogen-depleted intermediate gas; (b) passing the nitrogen-depleted intermediate gas into a second adsorption zone containing an adsorbent which is selective for the adsorption of nitrogen over argon and selective for the adsorption of argon over oxygen; (c) withdrawing an oxygen-enriched product gas from the second adsorption zone; and (d) terminating the passing of feed gas into the first adsorption zone and withdrawing an oxygen-enriched depressurization gas from the second adsorption zone in the same flow direction as (c). Nitrogen breakthrough from the first adsorption zone occurs and nitrogen is adsorbed in the second adsorption zone after nitrogen breakthrough.

Nitrogen breakthrough from the first adsorption zone can occur during (a) and nitrogen can be adsorbed in the second adsorption zone after nitrogen breakthrough. Alternatively, nitrogen breakthrough from the first adsorption zone can occur during (d) and nitrogen can be adsorbed the second adsorption zone after nitrogen breakthrough.

The concentration of nitrogen in the nitrogen-depleted intermediate gas withdrawn from the first adsorption zone after nitrogen breakthrough can be between about 0.5 vol % and the nitrogen concentration in the feed gas entering the first adsorption zone. Preferably, the oxygen-enriched product gas contains at least 97 vol % oxygen.

The adsorbent in the first adsorption zone can comprise one or more adsorbents selected from the group consisting of NaX, CaX, CaA, LiNaKX, LiZnX, wherein X represents an X zeolite with a Si/Al ratio of between about 1.0 and about 1.25.

The adsorbent in the second adsorption zone preferably comprises a silver-exchanged X zeolite with a ratio of the argon Henry's Law constant to the oxygen Henry's Law constant at 23° C. of at least about 1.05, and also which has a silver ion exchange level of less than or equal to about 0.7 of the total exchangeable sites in the zeolite. The cations in the X zeolite preferably comprise Li and Ag, and the ion exchange cation composition is of the form $Li_xAg_yM_zX$ where $0.85 \leq x+y \leq 1$, $0.2 \leq y \leq 0.7$, and $0.0 \leq z \leq 0.15$. M represents one or more cations, and x, y, and z represent fractions of total exchangeable sites in the zeolite. The adsorbent can have a silicon/aluminum ratio of less than about 1.25 and an argon/oxygen selectivity of greater than about 1.05.

The feed gas preferably is air. Alternatively, the concentration of oxygen in the feed gas can be between about 20 and about 95%, and the concentration of argon in the feed gas can be between about 1 and about 5 vol%.

The volume occupied by the second adsorption zone can be greater than about 35% and less than 100% of the total volume occupied by the first and second adsorption zones. Preferably, the volume occupied by the second adsorption zone is greater than 50% and less than 100% of the total volume occupied by the first and second adsorption zones. More preferably, the volume occupied by the second adsorption zone is greater than 50% and less than or equal to about 75% of the total volume occupied by the first and second adsorption zones. The first and second adsorption zones can comprise individual layers of adsorbent in a single vessel.

In one embodiment, the feed gas can be provided by a gas product from another pressure swing adsorption process, and wherein the gas product contains up to about 95 vol % oxygen.

The invention also is an adsorber for use in a pressure swing adsorption process for the recovery of oxygen from a feed gas comprising oxygen, nitrogen, and argon. The adsorber comprises:

(a) a vessel having an inlet end and an outlet end;
(b) a first adsorption zone containing an adsorbent which is selective for the adsorption of nitrogen over oxygen and argon;
(c) a second adsorption zone disposed between the first adsorption zone and the outlet end, wherein the second adsorption zone contains an adsorbent which is selective for the adsorption of nitrogen over argon and selective for the adsorption of argon over oxygen, and wherein the volume occupied by the second adsorption zone is greater than 50% and less than 100% of the total volume occupied by the first and second adsorption zones;
(d) piping means at the inlet end for passing the feed gas into the adsorber; and
(e) piping means at the outlet end for withdrawing an oxygen product gas from the adsorber.

The first and second adsorption zones can comprise respectively first and second layers of adsorbent in the vessel. In the adsorber, the volume occupied by the second layer of adsorbent preferably is greater than 50% and less than or equal to about 75% of the total volume occupied by the first and second layers of adsorbent.

The adsorbent in the first layer of adsorbent can comprise one or more adsorbents selected from the group consisting of NaX, CaX, CaA, LiNaKX, LiZnX, wherein X represents an X zeolite with a Si/Al ratio of between about 1.0 and about 1.25. The adsorbent in the second layer preferably comprises a silver-exchanged X zeolite in which the ratio of the argon Henry's Law constant to the oxygen Henry's Law constant at 23° C. is at least about 1.05 and in which the silver ion exchange level is less than or equal to about 0.7 of the total exchangeable sites in the zeolite. The adsorbent in the second layer preferably comprises an X zeolite having an ion exchange cation composition of the form $Li_xAg_yM_zX$ where $0.85 \leq x+y \leq 1$, $0.2 \leq y \leq 0.7$, and $0.0 \leq z \leq 0.15$, with M representing one or more cations, and x, y, and z representing fractions of total exchangeable sites in the zeolite. Preferably, the adsorbent has a silicon/aluminum ratio of less than about 1.25 and an argon/oxygen selectivity of greater than about 1.05.

DETAILED DESCRIPTION OF THE INVENTION

Figure 1:
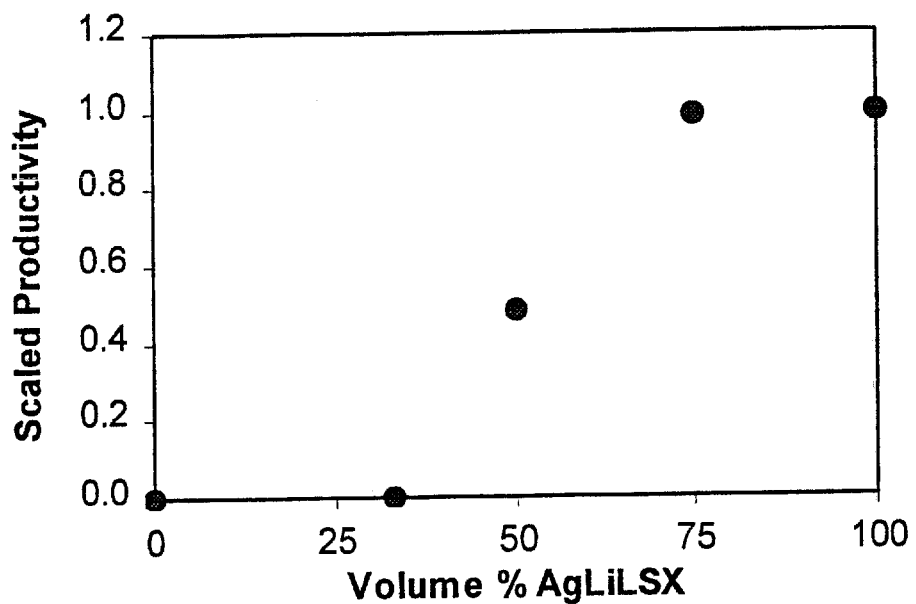
FIG. 1 is a plot of scaled productivity vs. volume % AgLiNaKLSX as determined from a simulation of a two-bed pressure swing adsorption process which provides a 99 vol % oxygen product according to the present invention.

The present invention is a pressure swing adsorption (PSA) process for the recovery of oxygen at high purity from a feed gas comprising oxygen, nitrogen, and argon. The process can operate with cycle steps at pressures above and below atmospheric pressure, which is sometimes described as vacuum swing adsorption (VSA) or vacuum-pressure swing adsorption (VPSA). In the present specification, pressure swing adsorption (PSA) is used as a generic term to describe all types of cyclic pressure swing adsorption systems regardless of operating pressure levels.

Typically, the feed gas is air; alternatively, the feed gas can be any gas mixture which contains oxygen, nitrogen, and argon. For example, in one embodiment of the invention the feed gas can be the product gas from a standard oxygen VSA system which produces oxygen at purities up to about 95 vol % with the remainder being nitrogen and argon. In this embodiment, the concentration of oxygen in this feed gas can be between 20 and 95 vol % and the concentration of argon in this feed gas can be between about 1 and about 5 vol %.

The process preferably utilizes two adsorption zones in series in which the first zone contains an adsorbent selective for the adsorption of nitrogen over argon and oxygen. The second zone contains an adsorbent which is selective for the adsorption of nitrogen over argon and selective for the adsorption of argon over oxygen. The zones can be separate adsorber vessels in series, but preferably the zones comprise layers of adsorbent in a single adsorber vessel. In the description which follows, a single adsorber vessel with at least two layers of adsorbent is used. If desired, another layer of adsorbent can be used at the adsorber vessel inlet to adsorb water, carbon dioxide, and other impurities from the air feed prior to the main separation process.

Any adsorbent which selectively adsorbs nitrogen over oxygen and argon can be used in the first adsorption zone. Examples of well-known adsorbents for this service include NaX, CaX, CaA, and LiNaKX, LiZnX, wherein X represents an X zeolite with Si/Al ratios of approximately 1.0 to 1.25. Adsorbents which can be used in the second adsorption zone include silver ion-exchanged X-type zeolites, preferably silver ion-exchanged lithium-X type zeolites. A preferred adsorbent is a silver-exchanged X-type zeolite, for example a silver-exchanged lithium-X zeolite having an ion exchange composition of the form $Li_xAg_yM_zX$ where $0.85 \leq x+y \leq 1$, $0.2 \leq y \leq 0.7$, and $0 \leq z \leq 0.15$. M represents one or more cations and x, y, and z represent fractions of total exchangeable sites in the zeolite. M can be a cationic form of one or more elements selected from alkaline or alkaline earth metals, rare earths, transition metals, or Group IIIA metals. M preferably is a cationic form of one or more elements selected from the group consisting of Na, K, Cs, Mg, La, Ce, Ca, Al, or Zn. Preferably, the adsorbent has a silicon/aluminum ratio of less than about 1.25 and an argon/oxygen selectivity of greater than about 1.05.

In the present disclosure, selectivity is defined generically as the degree of adsorption of one component relative to the degree of adsorption of another component on a given adsorbent. Selectivity of a first component over a second component is defined specifically herein as the ratio of the Henry's Law constant of the first component to the Henry's Law constant of the second component, where the Henry's Law constants are determined from the respective adsorption isotherms at a temperature of 23° C. The Henry's Law constant is defined as the initial slope of the pure gas adsorption isotherm at low adsorbate loading, where the isotherm is linear. The adsorbent in the second adsorption zone preferably is a silver-exchanged X zeolite which has a ratio of the argon Henry's Law constant to the oxygen Henry's Law constant at 23° C. of at least about 1.05 and which has a silver exchange level of less than or equal to about 0.7 of the total exchange sites in the zeolite.

The adsorption vessel containing the two adsorption zones comprising two adsorbent layers is operated utilizing the well-known pressure swing adsorption cyclic process steps of adsorption, depressurization, evacuation, purge, and repressurization. Any suitable combination and modification of these cyclic steps can be used. The process can utilize a single adsorber vessel with one or more storage tanks for storing gas produced earlier in the cycle for use later in the cycle for purge and/or repressurization. Alternatively, two or more adsorber vessels in parallel can be operated sequentially with overlapping cycle steps, and in this alternative gas storage tanks may or may not be required.

The adsorption step is defined as the time period in the adsorption cycle during which feed gas is introduced into the adsorber vessel or vessels while a gas enriched in one of the feed components, typically defined as product gas, is withdrawn from the vessel or vessels. The gas flow direction of the adsorption step is defined as the feed or forward flow direction. The pressure in the adsorber vessel during the adsorption step can be constant or can vary depending upon the relative rates of feed gas introduction and product gas withdrawal. The adsorption step proceeds by passing feed gas containing oxygen, nitrogen, and argon into an adsorber vessel which previously has been regenerated and repressurized to the initial pressure of the adsorption step. The feed gas typically is air which has been compressed to the desired pressure, although the feed gas can be any gas mixture containing oxygen, nitrogen, and argon.

The feed gas flows through the first adsorbent layer in which nitrogen is preferentially adsorbed over oxygen and argon, and then the nitrogen-depleted intermediate gas flows through the second adsorbent layer in which argon is preferentially adsorbed over oxygen. The nitrogen-depleted intermediate gas may contain residual nitrogen, as described below, and in this case this residual nitrogen would be adsorbed in the second adsorbent layer during at least a portion of the adsorption step. The high purity oxygen product gas, preferably containing at least 97 vol % oxygen, passes from the second adsorbent layer and is withdrawn from the adsorber vessel. The adsorption step ends when feed gas flow to the adsorber vessel is terminated.

The term nitrogen-depleted intermediate gas used herein means a gas withdrawn from the first adsorbent layer during the adsorption step. This nitrogen-depleted intermediate gas can range in concentration from 0 vol % nitrogen up to the concentration of the nitrogen in the feed gas to the first adsorbent layer.

The depressurization step follows the adsorption step and precedes the blowdown and/or evacuation steps (if these steps are used). During the depressurization step, the adsorber vessel typically is depressurized in the forward flow direction, i.e. in the same direction as the feed gas flow in the adsorption step, and oxygen-enriched depressurization gas is withdrawn at decreasing pressure for use as repressurization gas and/or purge gas. This oxygen-enriched gas also may be used as product gas. If a single adsorber vessel is used, this oxygen-enriched gas can be stored in one or more gas storage tanks for use later for repressurizing and/or purging the adsorber vessel. If two or more adsorber vessels in parallel are operated sequentially with overlapping cycle steps, gas storage tanks may not be required and the oxygen-enriched gas withdrawn from a given adsorber vessel can be utilized directly in another adsorber vessel or other adsorber vessels for repressurization and/or for purge. A significant portion of the oxygen-enriched gas used for repressurization is recovered as product in the adsorption step of the next adsorption process cycle. It is desirable, therefore, to optimize the volume and maximize the purity of the depressurization gas withdrawn for use as repressurization gas.

The depressurization step differs from the blowdown and/or evacuation steps in that the gas flow in these latter steps is countercurrent (i.e. opposite to the feed direction), and the gas withdrawn from these steps typically is vented or utilized as a byproduct.

The adsorption step and the depressurization step can be defined in combination as a combined forward flow stage during which oxygen-enriched gas is withdrawn from the adsorber vessel in the cocurrent direction (i.e. in the feed direction).

Nitrogen breakthrough as defined herein occurs at a time during the forward flow stage in which the leading edge of a nitrogen adsorption mass transfer zone or of a nitrogen desorption mass transfer zone reaches the end of the first adsorbent layer and nitrogen passes into the second adsorbent layer. Nitrogen breakthrough can occur when unadsorbed nitrogen passes into the second adsorbent layer during the adsorption step. If nitrogen breakthrough does not occur during the adsorption step, it will occur during the depressurization step when desorbed nitrogen from the first adsorbent layer passes into the second adsorption layer. The concentration of nitrogen in the gas passing into the second adsorbent layer at breakthrough typically ranges from a minimum of about 0.5 vol % to a maximum of the nitrogen concentration in the feed gas entering the first adsorbent layer. After nitrogen breakthrough, nitrogen passing from the first adsorption layer preferably is adsorbed in the second adsorption layer. After breakthrough, the concentration of nitrogen in the gas leaving the first adsorbent layer will increase. If the adsorption step is allowed to proceed long enough after breakthrough from the first adsorbent layer, the adsorbent in the first layer can reach nitrogen saturation.

The concentration of nitrogen in the gas at any axial location in the first or second adsorption layers in the adsorber vessel at any given time during the forward flow stage is defined as an average concentration taken over the cross-section of the adsorbent bed perpendicular to the flow direction.

When the nitrogen concentration profile at the start of the adsorption step is contained in the first adsorbent layer for the selected operating conditions, the initial nitrogen concentration in the gas leaving the first adsorbent layer during the adsorption step typically is relatively constant at a low level, for example below about 0.5 vol %. The nitrogen concentration profile is defined as the concentration of nitrogen as a function of axial distance into an adsorbent layer at a given time. After the leading edge of the nitrogen concentration profile reaches the end of this layer, breakthrough occurs and the concentration of nitrogen withdrawn from the first adsorption zone increases rapidly. That is, breakthrough occurs during the adsorption step. When the nitrogen concentration profile at the start of the adsorption step is not contained in the first adsorbent layer for the selected operating conditions, the initial nitrogen concentration in the gas leaving the first adsorbent layer will immediately begin to increase. In this case, breakthrough will occur at the beginning of the adsorption step.

The adsorption step proceeds (1) for a preselected time or (2) until a preferred degree of nitrogen breakthrough from the first adsorbent layer is reached. At this point the feed gas flow to the adsorber vessel is terminated and the adsorption step ends. Oxygen-enriched gas continues to be withdrawn from the adsorber vessel at decreasing pressure and the depressurization step proceeds (3) for a preselected time or (4) until a preferred degree of nitrogen breakthrough is reached at the end of the first adsorbent layer. If (2) and (4) are difficult to determine in actual adsorption system operation, the preselected times (1) and (3) can be determined from operating experience such that nitrogen breakthrough occurs during the adsorption step or the depressurization step.

After nitrogen breakthrough from the first layer, which occurs during either the adsorption step or the depressurization step, the gas entering the second adsorbent layer typically contains an increasing concentration of nitrogen. This nitrogen preferentially adsorbs in the initial portion of the second adsorbent layer, and begins to displace argon adsorbed earlier in the adsorption step. This causes a zone of desorbed argon to form ahead of the moving front of stronger-adsorbing nitrogen, and this zone contains a higher argon gas-phase concentration than that present in the gas entering the second adsorbent layer from the first adsorbent layer earlier in the adsorption step. A wave of gas containing this higher concentration of argon begins to move through the second adsorbent layer—a phenomenon which is termed "argon rollup". This localized increase in the gas phase concentration of argon causes more argon to adsorb, which sharpens the argon mass transfer zone in the second layer of adsorbent. This is a desirable phenomenon, because it improves the utilization of the adsorbent for argon removal in the second adsorbent layer. This in turn increases the recovery of oxygen-rich depressurization gas during the first portion of the depressurization step and the overall recovery of product gas during the adsorption step. Thus in the present invention it is preferred that nitrogen breakthrough from the first layer of adsorbent occurs during either the adsorption step or the depressurization step.

The time after nitrogen breakthrough from the first adsorbent layer at which the adsorption step is terminated or at which the depressurization step is terminated will depend on the properties of the adsorbents in the first and second adsorbent layers, the relative depth or volume of each adsorbent layer, the pressure and temperature in the adsorber vessel, the gas superficial velocity in the adsorbent layers, and the required oxygen product purity. Once these parameters are fixed, time of operation after breakthrough can be controlled by selecting the durations of the adsorption step and the depressurization step. Alternatively, if specific durations of the adsorption step and the depressurization step are preferred, the required depth or volume of each adsorbent layer can be fixed.

Proper selection of the operating time after nitrogen breakthrough from the first adsorbent layer during the adsorption step and the depressurization step will allow optimum adsorbent utilization for nitrogen in the first adsorption layer and for argon in the second adsorption layer at the required oxygen product purity.

The above description of the adsorbent layers is based on a typical cylindrical adsorber vessel containing the layers of adsorbent with gas flowing axially through the vessel. Other types of adsorber configurations can be used, such as for example radial flow beds or horizontal cross-flow beds, in which the features and benefits of the present invention also can be realized.

In one approach to adsorption system design, the size of each of the two adsorbent layers can be selected to maximize the production of oxygen for a given oxygen product purity. In a cylindrical adsorber vessel containing the layers of adsorbent with gas flowing axially through the vessel, in which the diameter of the vessel typically is constant in the axial direction, either depth or volume can be used to describe the relative size of each layer. In the present disclosure, the volume basis will be used, and the volume occupied by each layer will be described as a volume percent of the total volume occupied by the two layers. The volume basis also would be appropriate for example in radial flow beds or horizontal cross-flow beds.

Once the cycle times and other operating parameters have been determined, the volume percent of each layer can be selected so that a desired period of operation occurs after nitrogen breakthrough from the first layer. If the volume percent of the second layer is too small, nitrogen breakthrough into the second layer will not occur, and high purity oxygen cannot be provided at practical production levels. Conversely, if the volume percent of the second layer is too large, the potentially higher cost of the adsorbent in the second layer relative to that of the first layer could result in an economic penalty. It has been found in the present invention that the production of high purity oxygen (i.e. 97 vol % and above) preferably is carried out using at least about 35 volume percent in the second layer, and more preferably between 50 volume percent and about 75 volume percent in the second layer.

Several embodiments of the forward flow stage are possible. In one embodiment, the process is operated such that nitrogen breakthrough occurs from the first adsorbent layer during the latter period of the adsorption step. In another embodiment, breakthrough can occur from the first adsorbent layer throughout the entire adsorption step. In yet another embodiment, breakthrough occurs from the first adsorbent layer only during the depressurization step.

EXAMPLE 1

A silver-exchanged lithium low-silica X-type zeolite was prepared by the following method. The starting material was a beaded 0.93 Li, 0.07 Na+K, low silica X (LSX) zeolite with a Si/Al ratio of 1.0. The fraction 0.93 describes the fraction of the total ion exchangeable sites in the zeolite occupied by Li and the fraction 0.07 describes the fraction of the total ion exchangeable sites in the zeolite occupied by Na+K. The material was allowed to hydrate by leaving 11.355 liters of the LiNaKLSX in thin layers on trays exposed to the atmosphere for 48 hours. The starting solution was prepared by dissolving 2,893.25 g of $AgNO_3$ into 4,613 mol of $HNO_3$ in a 5 gallon bucket. The 11.355 liters of beads were then quickly poured into the bucket and stirred with a TEFLON rod to mix. The beads in solution were then allowed to sit at room temperature for 2 hours. The bucket contents were then poured onto a screen to remove the solution and the beads were returned to the bucket. Next, 1.75 gallons of deionized water at 70° C. were added to the beads and allowed to stand at room temperature for 30 minutes. The rinse solution is screened out and two more rinses at 30 minutes each were performed on the beads. After the final rinse solution was screened out, the beads were allowed to sit at room temperature overnight.

A portion of the adsorbent was activated by placing 9 mL into a 0.5 inch diameter steel tube which was placed into a standard tube furnace. A mixture of 80% nitrogen and 20% oxygen was sent through the bed at a rate of 385 mL/min while the following temperature program was run. The tube of adsorbent was held at 30° C. for 30 minutes and then the temperature was ramped up to 400° C. at a rate of 1.2° C./minute. The column of adsorbent was then held at 400° C. for 4 hours, after which it was allowed to cool to room temperature before being removed. After cooling, the column was transferred to a nitrogen-purged dry box for subsequent handling to prevent re-adsorption of water.

Figure 3:
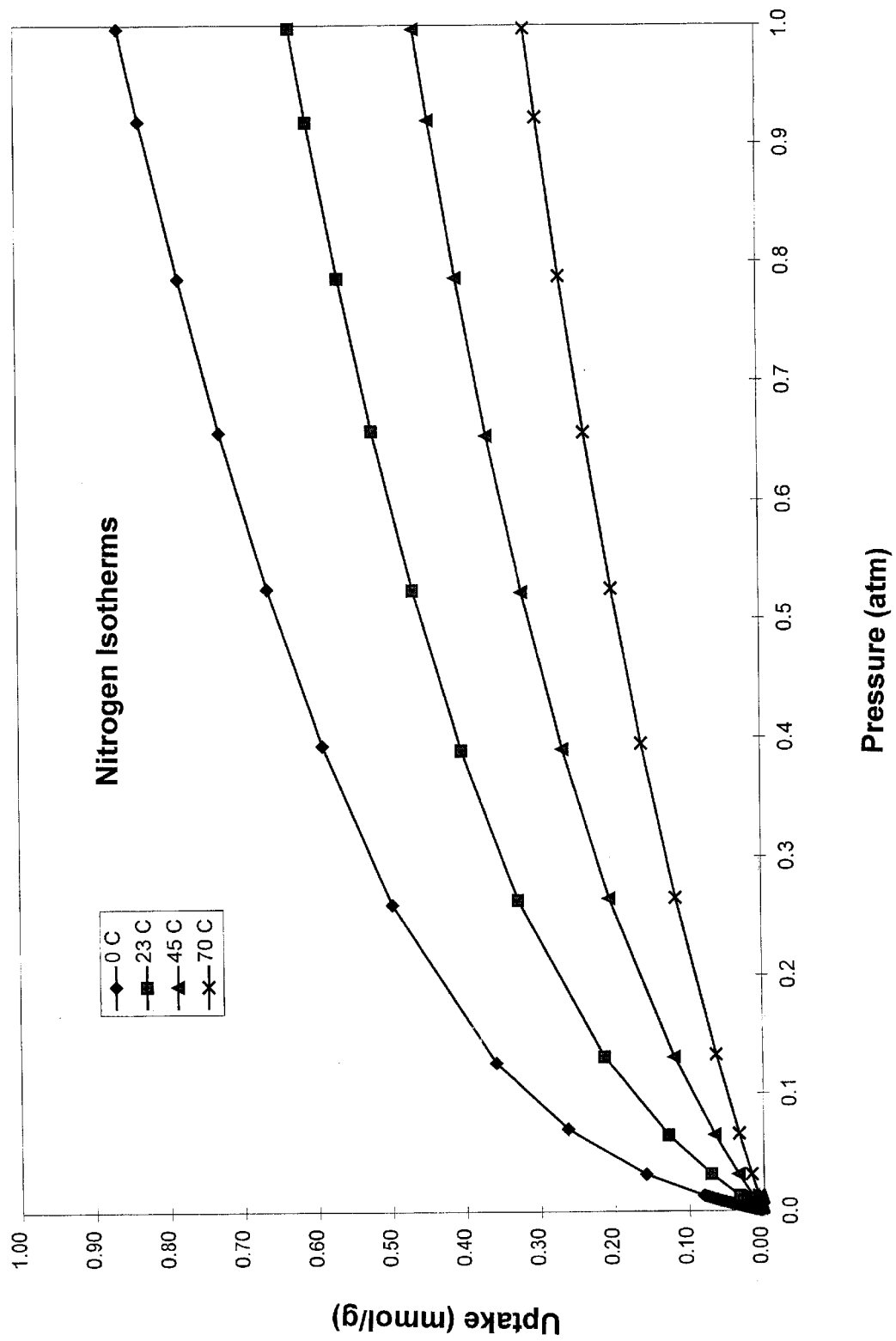
FIG. 3 is a plot of nitrogen isotherms at several temperatures on the AgLiNaKLSX zeolite utilized in the present invention.
Figure 4:
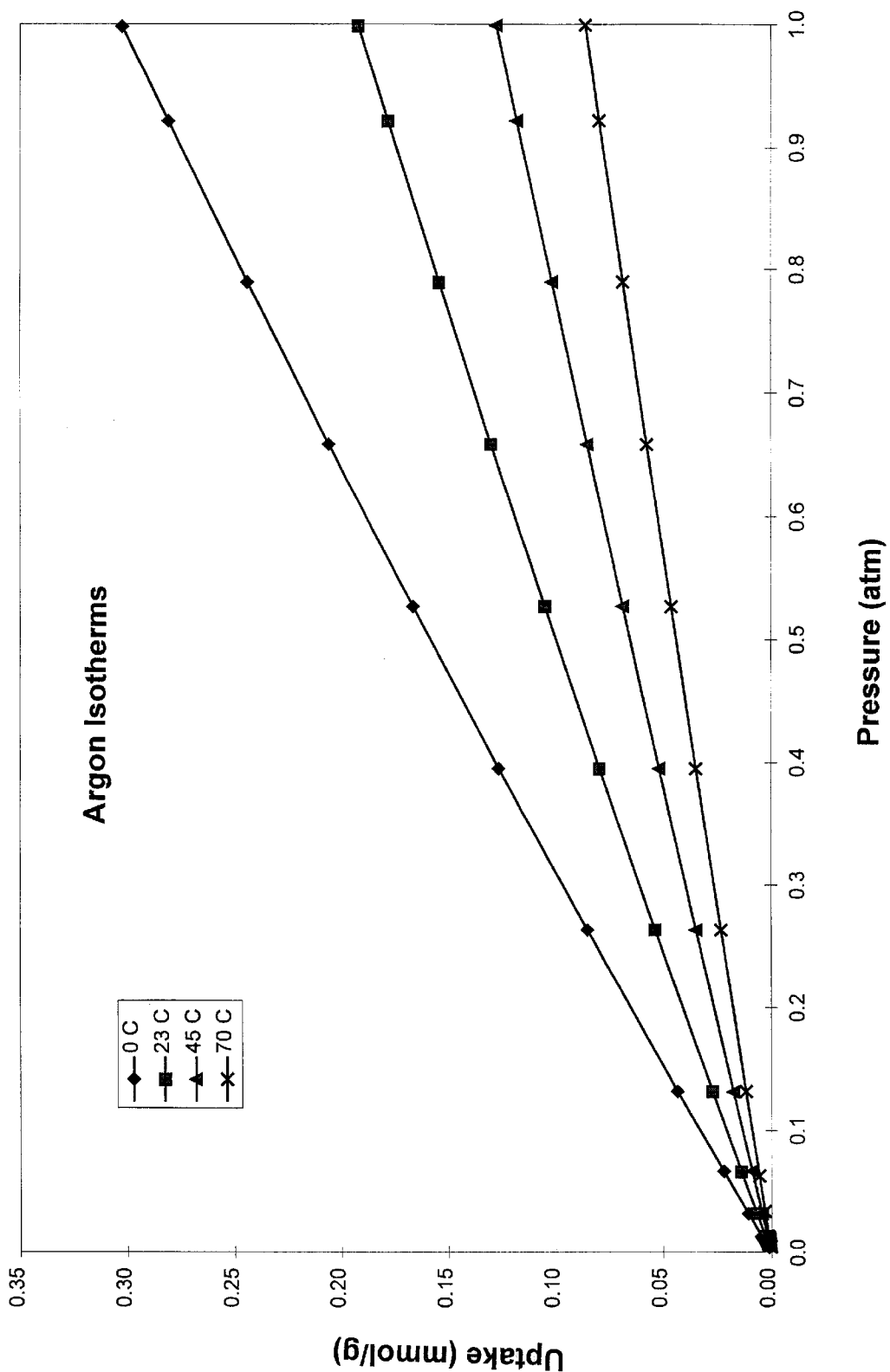
FIG. 4 is a plot of argon isotherms at several temperatures on the AgLiNaKLSX zeolite utilized in the present invention.
Figure 5:
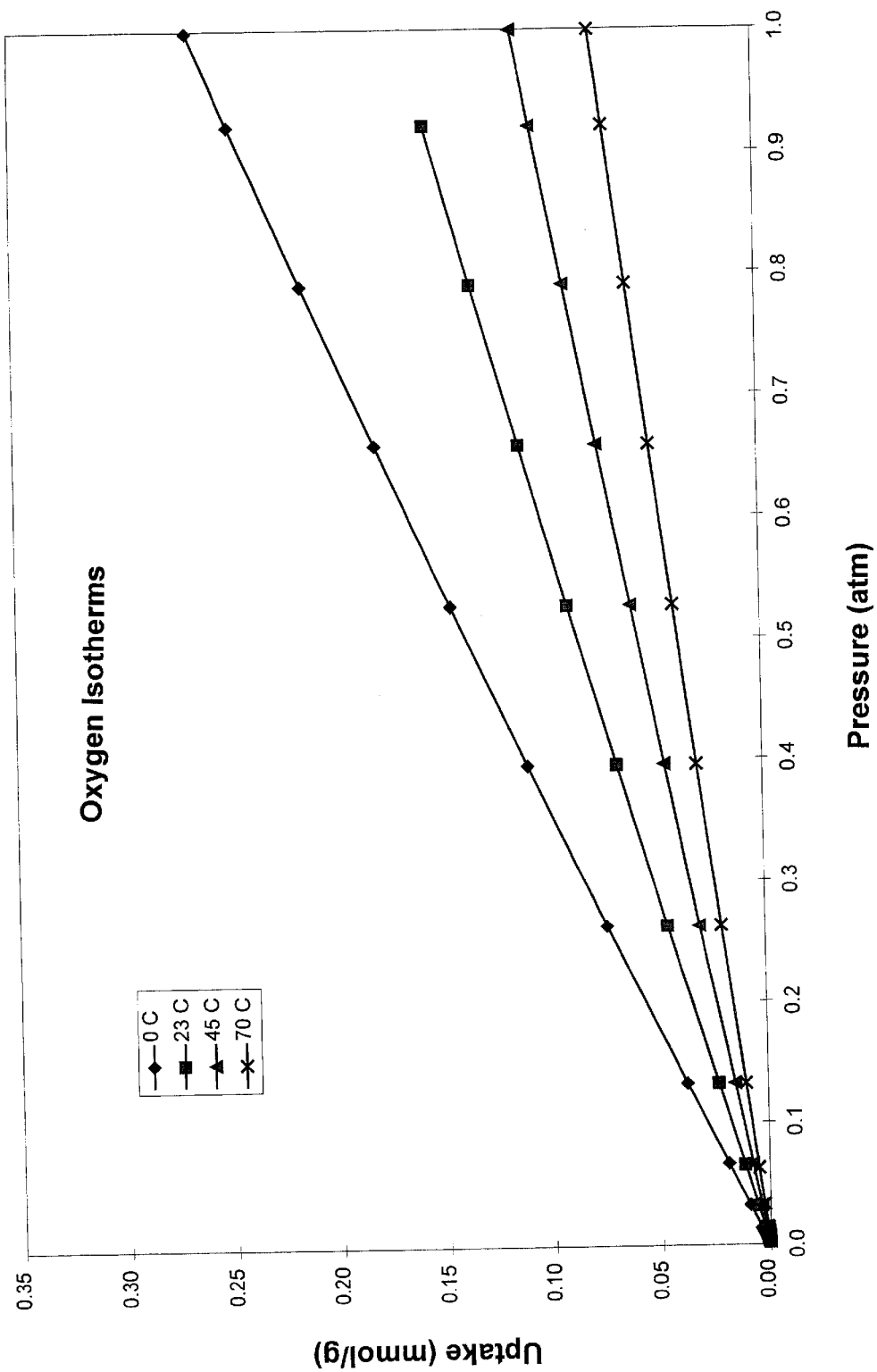
FIG. 5 is a plot of oxygen isotherms at several temperatures on the AgLiNaKLSX X-type zeolite utilized in the present invention.

The zeolite adsorbent prepared by this procedure is described herein as AgLiNaKLSX. The fractions of the total ion exchangeable sites in the zeolite structure occupied by Li, Ag, and Na+K were 0.59, 0.39, and 0.03 respectively. In terms of the general format used earlier to describe the adsorbent (i.e. $Li_xAg_yM_zX$), x=0.59, y=0.39, and z=0.03. Pure component adsorption isotherms for oxygen, nitrogen, and argon were determined for samples of this adsorbent at 0, 23, 45, and 70° C. using an ASAP 2010 from Micromeritics. The isotherm data are given in FIGS. 3, 4, and 5.

The Henry's Law constants were determined from the isotherm data and the selectivities were calculated as the ratios of the appropriate constants. The calculated selectivities are as follows: argon/oxygen, 1.2; nitrogen/oxygen, 9.7; and nitrogen/argon, 8.3. The isotherm data were fit to a dual-site Langmuir adsorption isotherm model, using the nonlinear least squares method.

EXAMPLE 2

A two-bed pressure swing adsorption cycle was modeled for three different feed compositions using an adsorption column simulator SIMPAC using isotherm data and selectivities determined above. The feed temperature was 100° F. The cycle used in the simulation was 60 seconds in duration, operated at pressures between 5 psia and 20 psia, and comprised the steps of (a) feed (23.5 sec)

(b) depressurization (3.5 sec)

(c) depressurization/evacuation (3 sec)

(d) evacuation/purge (27 sec)

(e) repressurization (3 sec)

Each bed volume in the simulation comprised a layer of a commercially-available LiLSX adsorbent towards the inlet which made up 25% of the total bed volume and a layer of the AgLiNaKLSX adsorbent of Example 1 which made up the remaining 75% of the total bed volume. The cycle was operated to produce a high purity product containing 99 vol % oxygen.

The oxygen recovery and relative productivity were determined for each of three feed compositions and the results are summarized in Table 1. Oxygen recovery is defined as the percentage of oxygen in the feed gas that is recovered as product. Productivity is defined as the oxygen production rate.

TABLE 1

Results of 2-Bed Cycle Simulation

| Feed Composition, volume % | | | | Relative |
|---|---|---|---|---|
| oxygen | Argon | Nitrogen | Oxygen Recovery, % | Productivity |
| 20.95 | 0.93 | 78.12 | 11.2 | 1.00 |
| 90.00 | 4.01 | 5.99 | 4.8 | 1.03 |
| 95.00 | 5.00 | 0.00 | 4.3 | 0.92 |

The results of this simulation indicated that both the oxygen recovery and the relative productivity are lowest when the feed gas contains no nitrogen. This indicates that it is preferred to have a feed gas which contains at least some nitrogen.

In practical applications, higher nitrogen concentrations in the feed gas (such as air, for example) are preferred for high oxygen recovery. This would be beneficial in the operation of a PSA system for which it is desired to minimize the power used for feed gas compression. In situations in which power is of relatively less importance (for example in smaller PSA systems), higher productivity would be preferred and would be achievable with a lower nitrogen feed concentration. It is a surprising result, however, that the absence of nitrogen in the feed gas leads to a significantly lower oxygen productivity.

The 90% oxygen feed stream of Table 1 could be provided for example by a PSA or VSA system operating on air feed. When operating with the 90 vol % oxygen feed stream, the byproduct stream contains 89.5 vol % oxygen could provide a secondary product stream of moderately pure oxygen, or alternatively could be used as purge gas for the PSA or VSA system operating on air feed.

EXAMPLE 3

Additional simulations were carried out using the same simulation method and adsorbent properties as in Example 2. Productivity (i.e. production rate) was determined at a product purity of 99 vol % oxygen for varying relative volumes of the two adsorbent layers, wherein the volume % of the AgLiNaKLSX layer was varied from 0 to 100% of the total volume of both layers.

The results are given in FIG. 1, which indicates that the AgLiNaKLSX layer should be greater than about 35 volume % and preferably between about 50 and about 75 volume %. At less than about 35 volume %, a product purity of 99 vol % oxygen cannot be achieved at a practical production level. At greater than about 75 volume %, the desired product purity can be readily achieved, but at a possible economic penalty when the potentially higher cost of AgLiNaKLSX relative to LiLSX is considered. The concentration profiles from the simulation show that when the AgLiNaKLSX layer is less than about 35 volume % of the total volume of both layers, nitrogen breakthrough into this layer does not occur, whereas at higher volume percent AgLiNaKLSX nitrogen breakthrough does occur.

EXAMPLE 4

Figure 2:
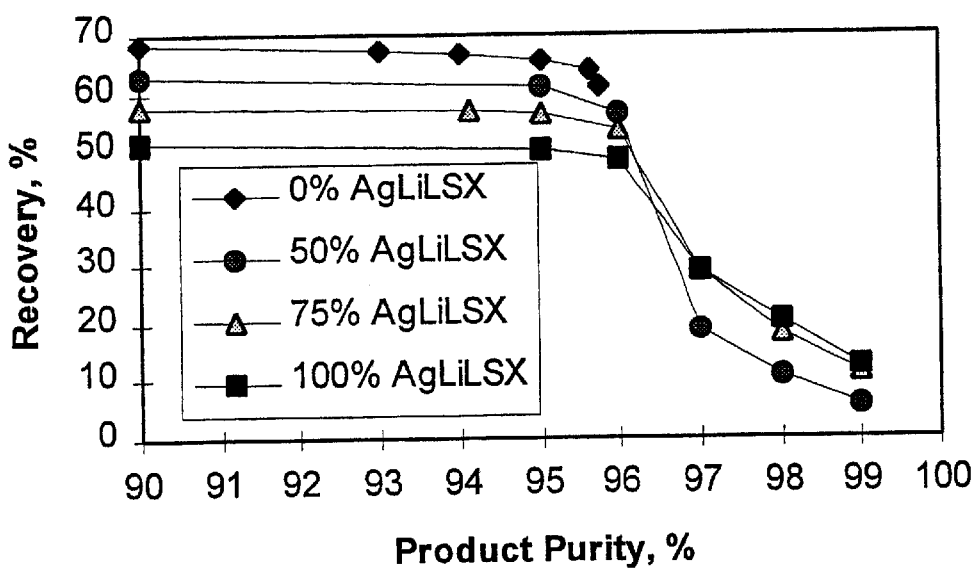
FIG. 2 is a plot of scaled oxygen recovery vs. oxygen product purity at various volume % AgLiNaKLSX as determined from a simulation of a two-bed pressure swing adsorption process according to the present invention.

Additional simulations were carried out using the same simulation method and adsorbent properties as used in Example 2. Oxygen product purity and recovery were determined at varying volume % of the AgLiNaKLSX layer between 0 and 100% of the total volume of both adsorbent layers. The results of the simulations are given in FIG. 2.

It is seen that at lower product purities (below about 96 vol %), the preferred adsorbent is LiLSX without the second layer of AgLiNaKLSX. Above this product purity, it is seen that LiLSX alone cannot be used, which is as expected since this adsorbent has no selectivity for argon over oxygen. Above about 96 vol % oxygen, the relationship of the oxygen recovery to the volume % AgLiNaKLSX reverses, and the higher volumes of AgLiNaKLSX are preferred. However, it is seen that the difference in oxygen recovery between 75 volume % and 100 volume % AgLiNaKLSX is negligible. The preferred amount of AgLiNaKLSX is between 50 and 75 volume %, a similar conclusion to that of Example 3.

Based on the results presented above, it was concluded that the use of higher volume % AgLiNaKLSX in a two-layer LiLSX/AgLiNaKLSX adsorber is preferable in the production of an oxygen product above 96 vol % oxygen purity, and that nitrogen breakthrough from the LiLSX layer is a benefit to the overall performance of the PSA system at these high oxygen product purities.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. In a cyclic pressure swing adsorption process for the recovery of oxygen from a feed gas comprising oxygen, nitrogen, and argon, a combined forward flow stage which comprises:
   (a) passing the feed gas into a first adsorption zone containing an adsorbent selective for the adsorption of nitrogen over oxygen and argon, and withdrawing therefrom a nitrogen-depleted intermediate gas;
   (b) passing the nitrogen-depleted intermediate gas into a second adsorption zone containing an adsorbent which is selective for the adsorption of nitrogen over argon and selective for the adsorption of argon over oxygen;
   (c) withdrawing an oxygen-enriched product gas from the second adsorption zone; and
   (d) terminating the passing of feed gas into the first adsorption zone and withdrawing an oxygen-enriched depressurization gas from the second adsorption zone in the same flow direction as (c);
   wherein nitrogen breakthrough from the first adsorption zone occurs and nitrogen is adsorbed in the second adsorption zone after nitrogen breakthrough.

2. The process of claim 1 wherein nitrogen breakthrough from the first adsorption zone occurs during (a) and nitrogen is adsorbed in the second adsorption zone after nitrogen breakthrough.

3. The process of claim 1 wherein nitrogen breakthrough from the first adsorption zone occurs during (d) and nitrogen is adsorbed in the second adsorption zone after nitrogen breakthrough.

4. The process of claim 1 wherein the concentration of nitrogen in the nitrogen-depleted intermediate gas withdrawn from the first adsorption zone after nitrogen breakthrough is between about 0.5 vol % and the nitrogen concentration in the feed gas entering the first adsorption zone.

5. The process of claim 1 wherein the oxygen-enriched product gas contains at least 97 vol % oxygen.

6. The process of claim 1 wherein the adsorbent in the first adsorption zone comprises one or more adsorbents selected from the group consisting of NaX, CaX, CaA, LiNaKX, LiZnX, wherein X represents an X zeolite with a Si/Al ratio of between about 1.0 and about 1.25.

7. The process of claim 1 wherein the adsorbent in the second adsorption zone comprises a silver-exchanged X zeolite which has a ratio of the argon Henry's Law constant to the oxygen Henry's Law constant at 23° C. of at least about 1.05 and which has a silver ion exchange level of less than or equal to about 0.7 of the total exchangeable sites in the zeolite.

8. The process of claim 7 wherein the cations in the X zeolite comprise Li and Ag, the ion exchange cation composition is of the form $Li_xAg_yM_zX$ where $0.85 \leq x+y \leq 1$, $0.2 \leq y \leq 0.7$, and $0.0 \leq z \leq 0.15$, with M representing one or more cations, and x, y, and z representing fractions of total exchangeable sites in the zeolite, and wherein the adsorbent has a silicon/aluminum ratio of less than about 1.25 and an argon/oxygen selectivity of greater than about 1.05.

9. The process of claim 1 wherein the feed gas is air.

10. The process of claim 1 wherein the concentration of oxygen in the feed gas is between about 20 and about 95 vol %, and the concentration of argon in the feed gas is between about 1 and about 5 vol %.

11. The process of claim 1 wherein the volume occupied by the second adsorption zone is greater than about 35% and less than 100% of the total volume occupied by the first and second adsorption zones.

12. The process of claim 11 wherein the volume occupied by the second adsorption zone is greater than 50% and less than 100% of the total volume occupied by the first and second adsorption zones.

13. The process of claim 12 wherein the volume occupied by the second adsorption zone is greater than 50% and less than or equal to about 75% of the total volume occupied by the first and second adsorption zones.

14. The process of claim 13 wherein the first and second adsorption zones comprise individual layers of adsorbent in a single vessel.

15. The process of claim 1 wherein the feed gas is provided by a gas product from another pressure swing adsorption process, and wherein the gas product contains up to about 95 vol % oxygen.

* * * * *